(12) United States Patent
Huang et al.

(10) Patent No.: US 9,236,616 B2
(45) Date of Patent: Jan. 12, 2016

(54) FUEL CELL ELECTRODE STRUCTURE CONTAINING PLATINUM ALLOY BLACK LAYER, PLATINUM ALLOY CARBON SUPPORT LAYER AND SUBSTRATE LAYER AND FUEL CELL USING THE SAME

(75) Inventors: Chiu-Ping Huang, Hsinchu (TW); Kan-Lin Hsueh, Hsinchu County (TW); Li-Duan Tsai, Hsinchu (TW); Sung-Chun Chang, Taipei (TW); Fu-Chi Wu, Taipei (TW); Du-Yuan Yu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 83 days.

(21) Appl. No.: 12/651,407

(22) Filed: Dec. 31, 2009

(65) Prior Publication Data

US 2010/0104924 A1   Apr. 29, 2010

Related U.S. Application Data

(62) Division of application No. 11/618,154, filed on Dec. 29, 2006, now abandoned.

(30) Foreign Application Priority Data

Dec. 30, 2005  (TW) .............................. 94147868 A
Mar. 31, 2006  (TW) .............................. 95111570 A

(51) Int. Cl.
*H01M 4/92*  (2006.01)
*H01M 8/10*  (2006.01)
*H01M 4/86*  (2006.01)

(52) U.S. Cl.
CPC ............ *H01M 4/921* (2013.01); *H01M 4/8642* (2013.01); *H01M 4/926* (2013.01); *H01M 8/1004* (2013.01); *Y02E 60/522* (2013.01)

(58) Field of Classification Search
CPC ... H01M 4/8642; H01M 4/921; H01M 4/926; H01M 8/1004
USPC ..................................... 429/44, 492, 524, 529
See application file for complete search history.

(56) References Cited

U.S. PATENT DOCUMENTS 5,795,669 A * 8/1998 Wilkinson et al. ............ 429/412
6,017,650 A * 1/2000 Ramunni et al. ................ 429/42

(Continued)

FOREIGN PATENT DOCUMENTS

CN         1553534 A      12/2004
JP         08-148151       6/1996

OTHER PUBLICATIONS

Machine translation of JP 08148151, Seki, Jun. 1996.*

(Continued)

*Primary Examiner* — Sean P Cullen

(57) ABSTRACT

An electrode structure of a fuel cell for power generation comprises an anodic structure, a cathodic structure, and an ionic exchange membrane disposed between the anodic and cathodic structures. The anodic and cathodic structures respectively are formed by multi-layer structures, to reduce the fuel crossover from the anodic structure to the cathodic structure, to reduce the catalysts applied amount, and to increase an output electrical energy of the fuel cell. The multi-layer structure of the anodic structure comprises a thin platinum alloy black layer, a Pt alloy layer disposed on the carbon material, and a substrate.

14 Claims, 14 Drawing Sheets

(56) References Cited

U.S. PATENT DOCUMENTS

| | | | | |
|---|---|---|---|---|
| 6,300,000 | B1* | 10/2001 | Cavalca et al. | 429/480 |
| 2002/0037449 | A1* | 3/2002 | Binder et al. | 429/42 |
| 2004/0058227 | A1* | 3/2004 | Tanaka et al. | 429/44 |
| 2004/0219419 | A1* | 11/2004 | Tani et al. | 429/40 |
| 2004/0229108 | A1 | 11/2004 | Valdez et al. | |
| 2008/0286632 | A1* | 11/2008 | Odgaard et al. | 429/40 |

OTHER PUBLICATIONS

Platinum black. (n.d.). Dictionary.com Unabridged. Retrieved Aug. 5, 2010, from Dictionary.com website: http://dictionary.reference.com/browse/platinum black.*

Alloy. (n.d.). Dictionary.com Unabridged. Retrieved Aug. 5, 2010, from Dictionary.com website: http://dictionary.reference.com/browse/alloy.*

* cited by examiner

FUEL CELL ELECTRODE STRUCTURE CONTAINING PLATINUM ALLOY BLACK LAYER, PLATINUM ALLOY CARBON SUPPORT LAYER AND SUBSTRATE LAYER AND FUEL CELL USING THE SAME

CROSS REFERENCE TO RELATED APPLICATIONS

This application is a Divisional of pending U.S. patent application Ser. No. 11/618,154, filed Dec. 29, 2006 and entitled "ELECTRODE STRUCTURE".

BACKGROUND OF THE INVENTION

1. Field of the Invention

The invention relates to an electrode structure, and in particular to an electrode structure of a fuel cell for power generation.

2. Description of the Related Art

In general, fuel cells having an anodic structure, a cathodic structure and an ionic exchange membrane generate power by converting chemical energy to electrical energy by electrochemical reaction therebetween. In the process of electrochemical reactions have the fuel oxidation and oxygen reduction. The fuel oxidation reaction of the anodic structure releases hydrogen ions, electrons and carbon dioxides. The oxygen reduction reaction of cathodic structure combines with anodic hydrogen ions, and the electrons releases water. In a conventional fuel cell, however, crossover of the liquid, colloidal, solid or gaseous organic fuel (e.g., alcohol, aldehyde or acid) from the anodic to cathodic structure is inevitable. Part of the fuel and water without reacting with the anodic catalyst directly pass through the ionic exchange membrane and reach the cathodic structure, resulting in a decrease of the catalytic reaction performance of the cathodic structure. A mixed potential is formed by the fuel on the cathodic structure produced oxidation reaction and with the nearby oxygen produced reduction reaction, thus reducing output voltage, output electrical power and fuel utilization of the fuel cell. Further, crossover of fuel results in the swell of the electrode adhesive between the cathodic electrode and the ionic exchange membrane, thus accelerating aging of the cathodic structure.

In FIG. 1A, a conventional anodic structure A1 of an organic fuel cell sequentially comprises a first substrate layer 111, a platinum alloy carbon support layer 112 and an ionic exchange membrane 2. The platinum alloy carbon support layer 112 disposed next to the ionic exchange membrane 2 comprises pluralistic carbon support particles 116, each covered by pluralistic platinum alloy particles 115 and appropriately polymers 118. The platinum alloy particles 115 catalyzed the liquid, gel, solid or gaseous organic fuel, e.g. alcohol, aldehyde or acid, of the anodic structures A1 to produce oxidation reaction. Because the platinum alloy particles 115 of the platinum alloy carbon support layer 112 are optimally distributed on the carbon support particles 116, the effective catalytic area and availability of the platinum alloy particles 115 increases. In FIG. 1B, a reference signal D1 represents a fuel path when the fuel travels through the platinum alloy carbon support layer 112. Due to the larger size of carbon support particles 116 and larger pore sizes therebetween, the fuel path D1 is relatively short. In FIG. 1C, a reference signal B1 represents a fuel concentration curve when the fuel travels through the anodic structure A1. The utilization of the platinum alloy particles 115 of the platinum alloy carbon support layer 112 is high and the fuel path D1 is relatively short, resulting in a smoothly declining fuel concentration curve B1.

In FIG. 2A, an anodic structure A2 sequentially comprises the first substrate layer 111 and a platinum alloy black layer 121 disposed next to the ionic exchange membrane 2. The platinum alloy black layer 121 comprises the platinum alloy particles 115 and appropriately polymers 118. Because the platinum alloy particles 115 tend to aggregate, the inside of the aggregated platinum alloy particles 115 cannot react with the fuel, and thus the effective catalytic area of the aggregated platinum alloy particles 115 is low, i.e., the availability of the platinum alloy particles 115 decreases. In FIG. 2B, a reference signal D2 represents a fuel path when the fuel travels through the platinum alloy black layer 121. Because the platinum alloy particles 115 are small and the pore sizes between are tortuously, the fuel path D2 of the fuel traveling through the platinum alloy black layer 121 is relatively long. In FIG. 2C, a reference signal B2 represents a fuel concentration curve when the fuel travels through the anodic structure A2. The utilization of the platinum alloy particles 115 of the platinum alloy carbon black layer 121 is low and the fuel path D2 is relatively long, resulting in a sharply declining fuel concentration curve B2.

FIG. 3 shows a discharge interval of the cathode and anode potentials of the fuel cell. A reference signal VA represents a theoretical potential of cathodic oxygen reduction, and a reference signal VB represents a practical potential of cathode discharge. The distance is between the theoretical potential VA and the practical potential VB of cathode discharge is an over-potential caused by cathodic oxygen reduction. A reference signal VC represents a practical potential of anode discharging, and a reference signal VD represents a theoretical potential of the fuel. The distance is between the practical potential VC of anode discharging and the theoretical potential VD of the fuel is an overpotential caused by fuel oxidation reaction. The distance between the cathodic practical potential VB and the anodic practical potential VC is an output voltage of the discharge fuel cell.

There is fuel oxidation reaction in the cathode, when the fuel of anodic structure permeates through the cathodic structure. The cathodic practical potential VB has gone down and the output voltage of the fuel cell has decreasing. It is understood that crossover of the fuel from the anodic structure throughout the cathodic structure is an unwanted situation.

The platinum alloy carbon support layer 112 of the anodic structures A1 or the platinum alloy black layer 121 of the anodic structure A2 must be thickened can solve the problems such as fuel crossover caused by the described liquid, gel, solid or gaseous organic fuel (e.g., alcohol, aldehyde or acid) The fuel path D1 is relatively short and the thickened platinum alloy carbon support layer 112 can avoid the corssover of the fuel, however, cracks form on the platinum alloy carbon support layer 112 and lowers the utilization of the catalyst adjacent to the ionic exchange membrane 2 when the platinum alloy carbon support layer 112 is too thick.

Note that the fuel path D2 of the anodic structure A2 is longer than the fuel path D1 of the anodic structures A1. If the platinum alloy black layer 121 of the anodic structure A2 is thickened, the product of fuel reaction, e.g. carbon dioxide, requires more time to travel through the fuel path D2, thus, the efficiency of the fuel cell decreases. In general, the cost of the platinum alloy carbon support layer 112 or the platinum alloy layer black 121 is substantially 70% of the total material of a fuel cell. Thus, the thickened platinum alloy carbon support layer 112 or the thickened platinum alloy black layer 121 increases the fuel cell material cost.

Based on the defects caused by the described fuel crossover of the liquid, gel, solid or gaseous organic fuel, e.g. alcohol, aldehyde or acid and the low catalyst utilization, the invention provides an electrode structure utilizing a small amount of catalyst in a catalytic layer to lower fuel crossover, consume the fuel in the anodic structure, avoid the fuel from the anode structure diffusion to the cathodic structure, increase the output voltage of the fuel cell.

BRIEF SUMMARY OF THE INVENTION

The aim of the invention at the provides an electrode structure applied to fuel cell, decreased the fuel of the liquid, gel, solid or gaseous organic fuel, e.g. alcohol, aldehyde or acid corssover. It can increase the output voltage of the fuel cell and power density, and than decrease the total material cost of the fuel cell caused by lessen catalyst amount.

An electrode structure of a fuel cell for power generation comprises an anodic structure, a cathodic structure, and an ionic exchange membrane disposed between the anodic and cathodic structures. The anodic structure sequentially comprises a thin platinum alloy black layer disposed next to the ionic exchange membrane, a platinum alloy carbon support layer and a substrate layer. The thin platinum alloy black layer comprises plurality of platinum alloy particles and appropriately polymers. The platinum alloy particles applied to catalyze the anode catalyst by platinum (Pt) combined with components such as Sn, Mo, Rh, W, Pd, Ir or Au. The thin platinum alloy black layer is a thin and dense catalyst layer.

The invention provides an electrode structure having a low fuel crossover and high reaction discharge efficiency with respect to the conventional anode structure, to eliminate aging of the cathode structure.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
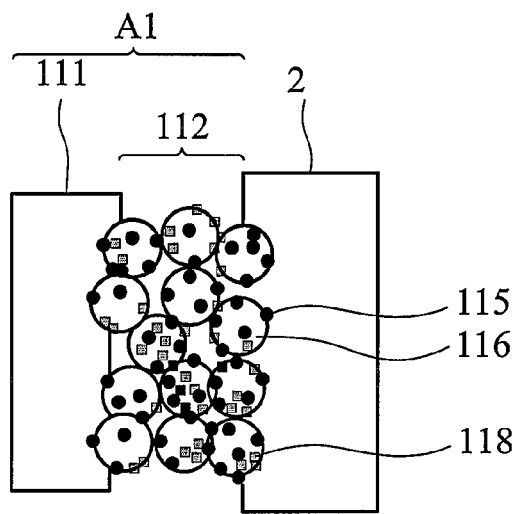
FIG. 1A is a schematic view of a conventional anodic structure (A1) of a fuel cell.
Figure 1B:
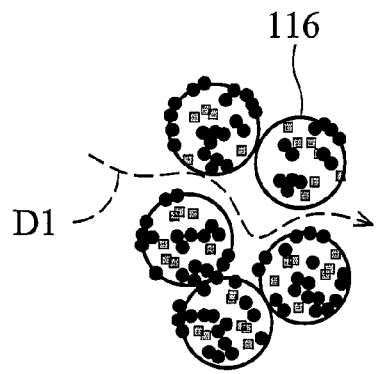
FIG. 1B is a schematic view of a fuel path (D1) of the anodic structure (A1) when the fuel travels through a platinum alloy carbon support alloy layer.
Figure 1C:
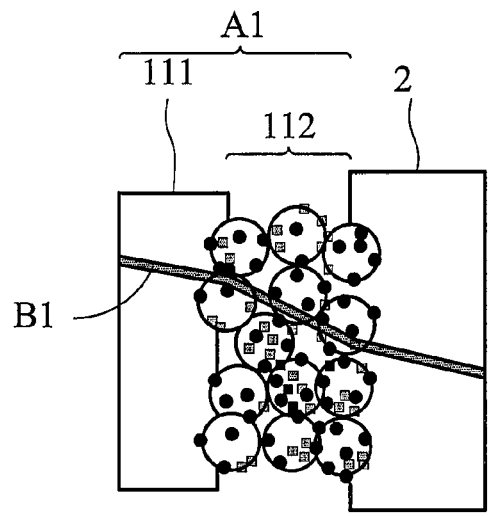
FIG. 1C is a schematic view of fuel concentration variation when the fuel travels through the anodic structure (A1)
Figure 2A:
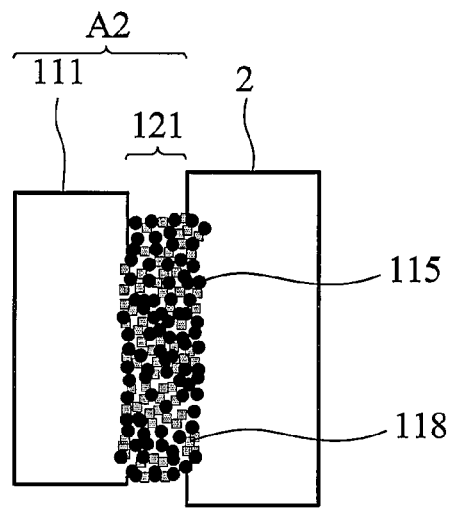
FIG. 2A is a schematic view of a conventional anodic structure (A2) of a fuel cell.
Figure 2B:
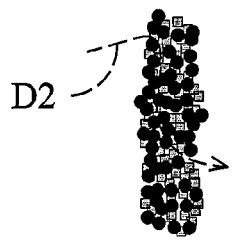
FIG. 2B is a schematic view of a fuel path (D2) of the anodic structure (A2) when the fuel travels through a platinum alloy black layer.
Figure 2C:
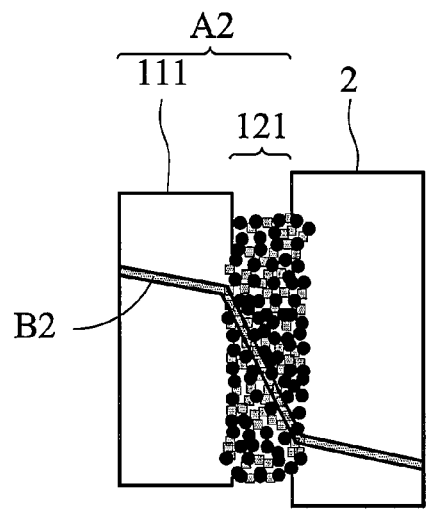
FIG. 2C is a schematic view of fuel concentration variation when the fuel travels through the anodic structure (A2)
Figure 3:
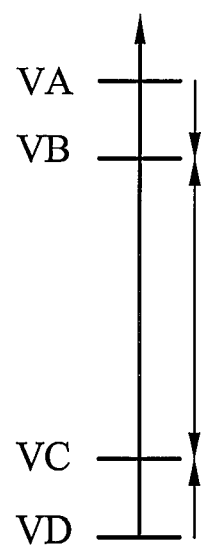
FIG. 3 is a schematic view of a voltage of a fuel cell.
Figure 4:
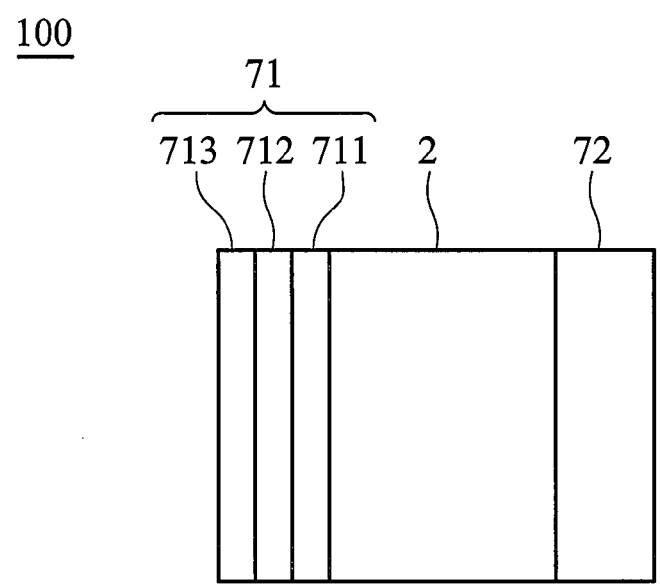
FIG. 4 is a schematic view of an electrode structure (100) of a fuel cell of the invention.

In FIG. 4, a power generation fuel cell of a first embodiment comprises a fuel (not shown in FIGS.) and an electrode structure 100 used to actuate the fuel to generate electricity. The electrode structure 100 sequentially comprises a cathodic structure 72, an ionic exchange membrane 2 disposed next to the cathodic structure 72, and an anodic structure 71. The anodic structure 71 sequentially comprises a first thin platinum alloy black layer 711 disposed next to the ionic exchange membrane 2, a platinum alloy carbon support layer 712 and a first substrate layer 713. The first thin platinum alloy black layer 711 is a thin and dense catalyst layer by a plurality of platinum alloy particles (not shown in FIGS.). The platinum alloy particles are formed by platinum (Pt) combined with components such as Sn, Mo, Rh, W, Pd, Ir or Au. The platinum alloy carbon support layer 712 comprises a plurality of carbon support particles (not shown in FIGS.) which are made of conductive and anti-corrosive carbon material. The ionic exchange membrane 2 is made of Nafion®/Nafion® derivatives, non-perfluoro chemicals and derivatives thereof, or hydrocarbon, and the first substrate layer 713 can be a carbon substrate. The following anodic structures A3, A4 and A5 are three exemplary embodiments of the anodic structure 71.

Figure 5A:
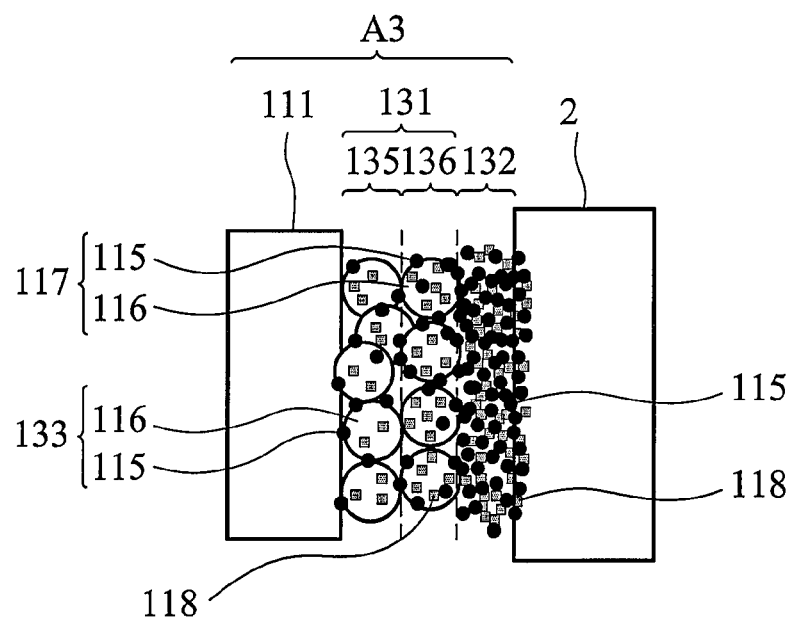
FIG. 5A is a schematic view of an anodic structure (A3) of the invention.

In FIG. 5A, the anodic structure A3 sequentially comprises a first thin platinum alloy black layer 132 disposed next to the ionic exchange membrane 2, a platinum alloy carbon support layer 131, and a first substrate layer 111. The platinum alloy carbon support layer 131 comprises a low catalytic platinum alloy carbon support layer 135 containing a first catalytic platinum alloy carbon concentration and disposed next to the first substrate layer 111, and a high catalytic platinum alloy carbon support layer 136 containing a second platinum alloy carbon support layer and disposed between the carbon support layer 135 and the first thin platinum alloy black layer 132. The first catalytic platinum alloy carbon concentration is not greater than the at least one second platinum alloy carbon support layer. The first catalytic platinum alloy carbon concentration and the second platinum alloy carbon support layer are substantially between 10 to 90 wt %. The first catalytic platinum alloy carbon concentration is not less than 10 wt %, and the second platinum alloy carbon support layer is not greater than 90 wt %. In the embodiment, the first substrate layer 111 can be a carbon substrate such as carbon paper, carbon cloth, carbon fiber or carbon plate.

To specify the electrode structure in the following description, the low catalytic platinum alloy 135 with the first catalytic platinum alloy carbon concentration is defined as a low catalytic platinum alloy carbon support layer, and the high catalytic platinum alloy carbon support layer 136 with the second platinum alloy carbon support layer is defined as a high catalytic platinum alloy carbon support layer.

The high catalytic platinum alloy carbon support layer 136 comprises a plurality of high platinum alloy carbon support particles 117 and an appropriately polymers 118, and the low catalytic platinum alloy carbon support layer 135 comprises a plurality of low platinum alloy carbon support particles 133 and an appropriately polymers 118. The first thin platinum alloy black layer 132 comprises a appropriately polymers 118 and a plurality of platinum alloy particles 115, and the platinum alloy particles 115 are linked by the polymers 118 to form the first thin platinum alloy black layer 132. The high platinum alloy carbon support particles 117 are linked by the polymers 118 to form the high catalytic platinum alloy carbon support layer 136. The low platinum alloy carbon support particles 133 comprise a plurality of carbon support particles 116 and the platinum alloy particles 115. The low platinum alloy carbon support particles 133 are linked by the polymers 118 to form the low catalytic platinum alloy carbon support layer 135. The high platinum alloy carbon support particles 117 comprise the carbon support particles 116 and the platinum alloy particles 115. The low platinum alloy carbon support particles 133 differs from the platinum alloy particles 115 in that the amount of the platinum alloy particles 115 of the high platinum alloy carbon support particles 117 is greater than the amount of the platinum alloy particles 115 of the low platinum alloy carbon support particles 133. Additionally, the first thin platinum alloy black layer 132 is preferably covered on the surface of the ionic exchange membrane 2 or the platinum alloy carbon support layer 131.

Figure 5B:
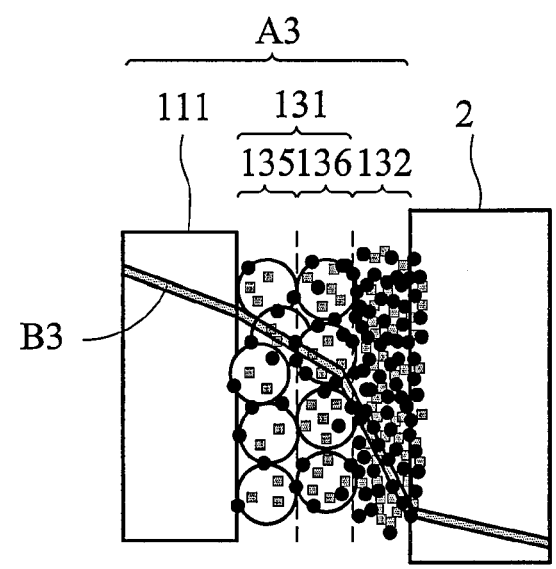
FIG. 5B is a schematic view of fuel concentration when the fuel travels through the anodic structure (A3)

In FIG. 5B, a reference signal B3 represents a fuel concentration curve when the fuel travels through the anodic structure A3. The fuel concentration curve B3 obviously declines when the fuel travels through the platinum alloy carbon support layer 131 and the first thin platinum alloy black layer 132, i.e., most of the fuel in the anodic structure A3 has a complete reaction. The fuel is an available fuel comprising liquid, gel, solid or gaseous organic fuel, e.g. alcohol, aldehyde or acid. Thus, the corssover can be controlled by regulating the percentage of the low catalytic platinum alloy carbon support layer 135 and the high catalytic platinum alloy carbon support layer 136, to increase performance of the fuel cell.

Figure 6A:
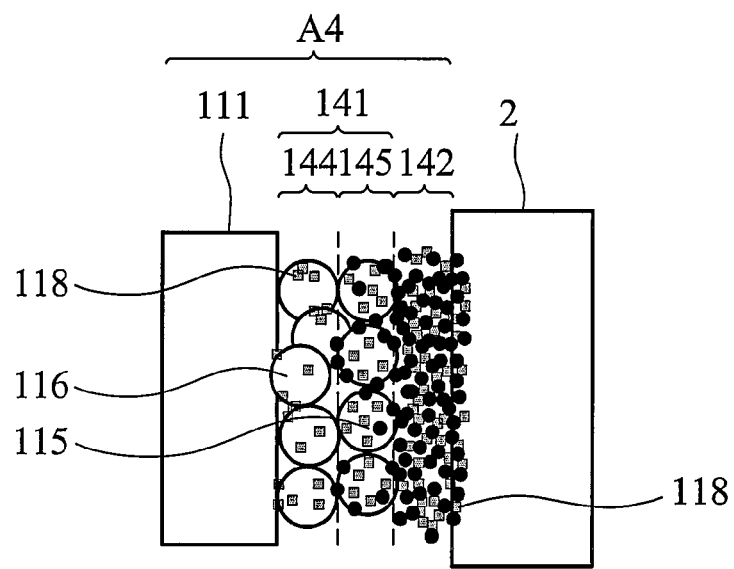
FIG. 6A is a schematic view of an anodic structure (A4) of the invention.

In FIG. 6A, the anodic structure A4 sequentially comprises a first thin platinum alloy black layer 142 disposed next to the ionic exchange membrane 2, a platinum alloy carbon support layer 141 and a first substrate layer 111. The platinum alloy carbon support layer 141 comprises a first non-catalytic carbon support layer 144 and a high catalytic platinum alloy carbon support layer 145. The combination of the first thin platinum alloy black layer 142 and the high catalytic platinum alloy carbon support layer 145 of the anodic structure A4 is similar to the combination of the first thin platinum alloy black layer 132 and the high catalytic platinum alloy carbon support layer 136 of the anodic structure A4 in FIG. 5A. Additionally, the first thin platinum alloy black layer 142 is preferably covered on the surface of the ionic exchange membrane 2 or the platinum alloy carbon support layer 141. The first non-catalytic carbon support layer 144 comprises a plurality of carbon support particles 116 and a appropriately polymers 118 dispersed on surfaces of the carbon support particles 116, and the carbon support particles 116 are linked by the polymers 118 to form the non-catalytic carbon support layer 144. The non-catalytic carbon support layer 144 serves as a cubic barrier to block the diffusing fuel, so that the diffusion rate of the fuel traveling through the anodic structure A4 can be regulated by controlling the thickness and porosity of the non-catalytic carbon support layer 144. Based on the non-catalytic carbon support layer 144, the fuel can be completely consumed by the high catalytic platinum alloy carbon support layer 145 and the first thin platinum alloy black layer 142. Additionally, the platinum alloy carbon support layer 141 is preferably a combination of the non-catalytic carbon support layer 144 and a low catalytic platinum alloy carbon support layer (not shown in FIGS.), wherein the low catalytic platinum alloy carbon support layer has a configuration similar to the low catalytic platinum alloy carbon support layer 135 of the anodic structure A3.

Figure 6B:
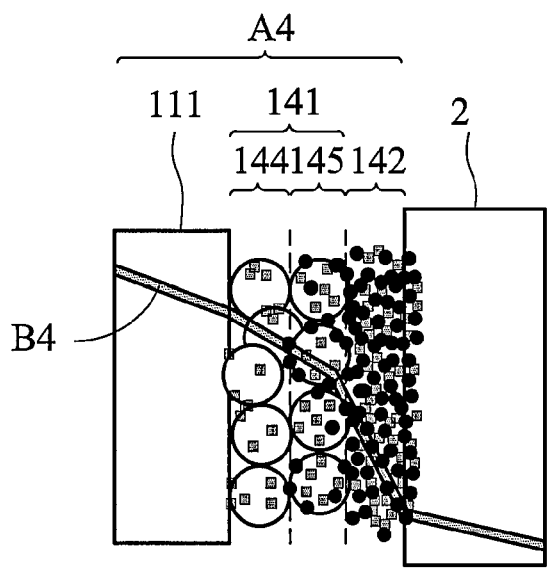
FIG. 6B is a schematic view of fuel concentration variation when the fuel travels through the anodic structure (A4)

In FIG. 6B, a reference signal B4 represents a fuel concentration curve when the fuel travels through the anodic structure A4. The fuel concentration curve B4 obviously declines when the fuel travels through the platinum alloy carbon support layer 141 and the first thin platinum alloy black layer 142, i.e., most of the fuel in the anodic structure A4 has a complete reaction. Furthermore, the distribution of the fuel concentration can be controlled by regulating the percentage of the first non-catalytic carbon support layer 144 and the high catalytic platinum alloy carbon support layer 145, to consume the fuel traveling through the anodic structure A4 and to increase performance of the fuel cell.

Figure 7A:
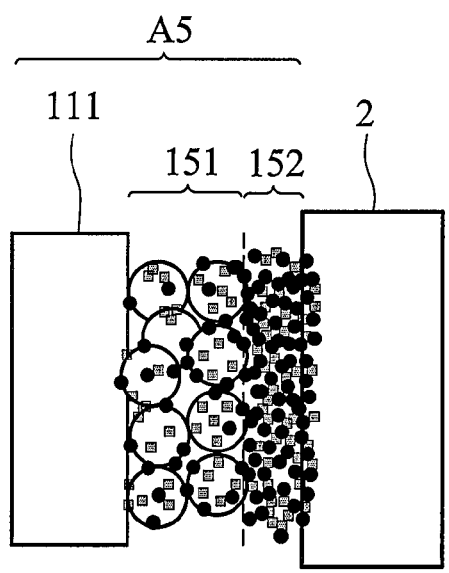
FIG. 7A is a schematic view of an anodic structure (A5) of the invention.

In FIG. 7A, the anodic structure A5 sequentially comprises a first thin platinum alloy black layer 152 disposed next to the ionic exchange membrane 2, a platinum alloy carbon support layer 151 and a first substrate layer 111. The platinum alloy carbon support layer 151 can be a high catalytic platinum alloy carbon support layer (not shown in FIGS.), wherein the combination of the high catalytic platinum alloy carbon support layer and the first thin platinum alloy black layer 152 has a configuration similar to the high catalytic platinum alloy carbon support layer 136 and the first thin platinum alloy black layer 132 of the anodic structure A3. Additionally, the first thin platinum alloy black layer 152 is preferably covered on the surface of the ionic exchange membrane 2 or the platinum alloy carbon support layer 151. The platinum alloy carbon support layer 151 can be a low catalytic platinum alloy carbon support layer (not shown in FIGS.), having a combination similar to the low catalytic platinum alloy carbon support layer 135 of the anodic structure A3.

Figure 7B:
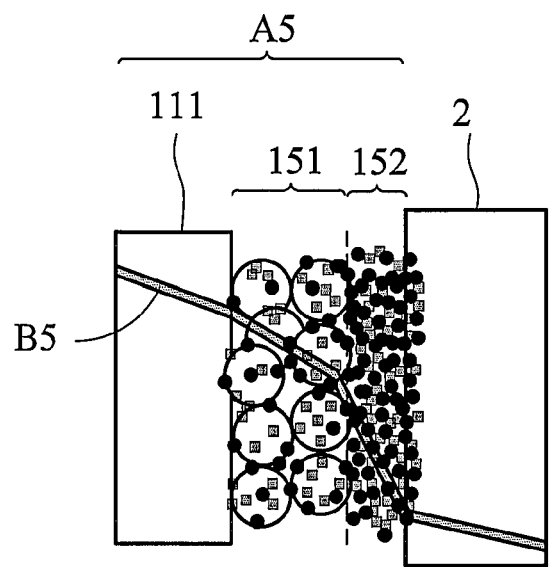
FIG. 7B is a schematic view of fuel concentration variation when the fuel travels through the anodic structure (A5)

In FIG. 7B, a reference signal B5 represents a fuel concentration curve when the fuel travels through the anodic structure A5. The fuel concentration curve B5 obviously declines when the fuel travels through the platinum alloy carbon support layer 151 and the first thin platinum alloy black layer 152, i.e., most of the fuel in the anodic structure A5 has a complete reaction. The distribution of the fuel concentration can be controlled by regulating the percentage of the platinum alloy carbon support layer 151 and the first thin platinum alloy black layer 152, to consume the fuel traveling through the anodic structure A5 and to increase performance of the fuel cell.

The following cathode structures C1, C2, C3, C4 and C5 are five exemplary embodiments of the cathode structure 72.

Figure 8:
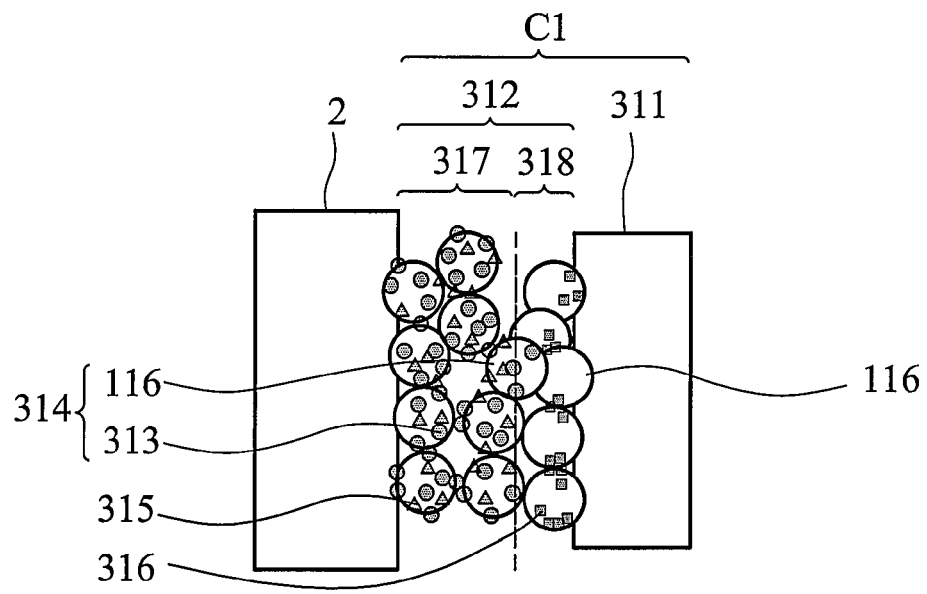
FIG. 8 is a schematic view of a cathodic structure (C1) of the invention.

In FIG. 8, the cathode structure C1 comprises a carbon support layer 312 and a second substrate layer 311. The carbon support layer 312 sequentially comprises a platinum catalytic carbon support layer 317 disposed next to the ionic exchange membrane 2 and a non-catalytic carbon support layer 318. The platinum catalytic carbon support layer 317 comprises a plurality of platinum catalytic carbon support particles 314 and an appropriately of second polymers 315. The platinum catalytic carbon support particles 314 comprises a plurality of carbon support particles 116 and a plurality of platinum catalytic particles 313 dispersed on surfaces of the carbon support particles 116. The platinum catalytic carbon support particles 314 are linked by the second polymers 315 to form the platinum catalytic carbon support layer 317. A second non-catalytic carbon support layer 318 comprises a plurality of carbon support particles 116 and a plurality of third polymers 316 dispersed on surfaces of the carbon support particles 116. The carbon support particles 116 are linked by the third polymers 316 to form the non-catalytic carbon support layer 318. The carbon support particles 116 are preferably made of conductive and anti-corrosive carbon material. The second polymers 315 are preferably made of Nafion®/Nafion® derivatives, non-perfluoro chemicals and derivatives thereof, or hydrocarbon, and the third polymers 316 are preferably made of perfluoro chemicals and derivatives thereof, non-perfluoro chemicals and derivatives thereof, or hydrocarbon. The second substrate layer 311 can be a carbon substrate, and the non-catalytic carbon support layer 318 regulates the diffusion rate of the oxygen and serves as a bumping layer between the platinum catalytic carbon support layer 317 and the second substrate layer 311. Note that the platinum catalytic carbon support layer 317 catalyzes oxygen located in the cathode structure C1 to perform a reduction reaction.

Figure 9:
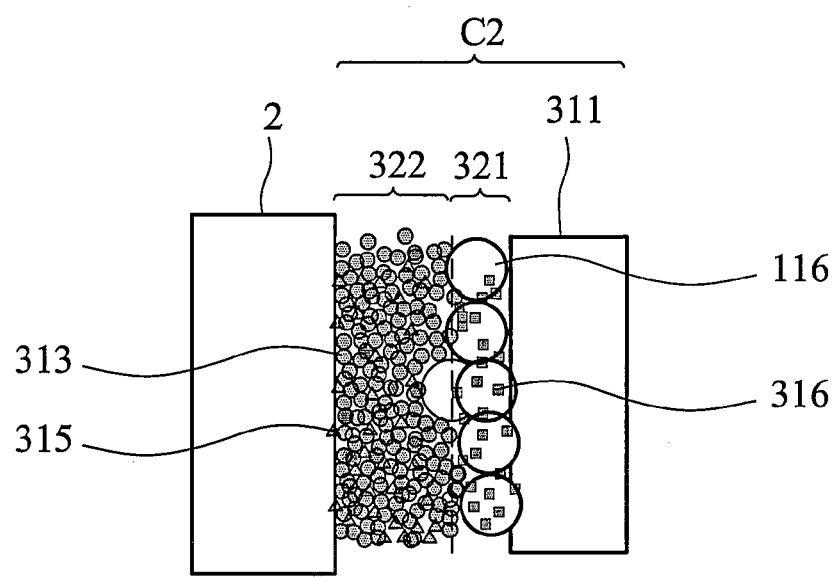
FIG. 9 is a schematic view of a cathodic structure (C2) of the invention.

In FIG. 9, the cathode structure C2 sequentially comprises a platinum alloy black layer 322 disposed next to the ionic exchange membrane 2, a non-catalytic carbon support layer 321 and a second substrate layer 311. The platinum alloy black layer 322 comprises a plurality of platinum catalytic particles 313 and an appropriately second polymers 315, and the platinum catalytic particles 313 are linked by the second polymers 315 to form the platinum alloy black layer 322. The configuration of the non-catalytic carbon support layer 321 of the cathode structure C2 is similar to the non-catalytic carbon support layer 318 of the cathode structure C1, and the platinum alloy black layer 322 catalyzes oxygen located in the cathode structure C2 to perform a reduction reaction.

Figure 10:
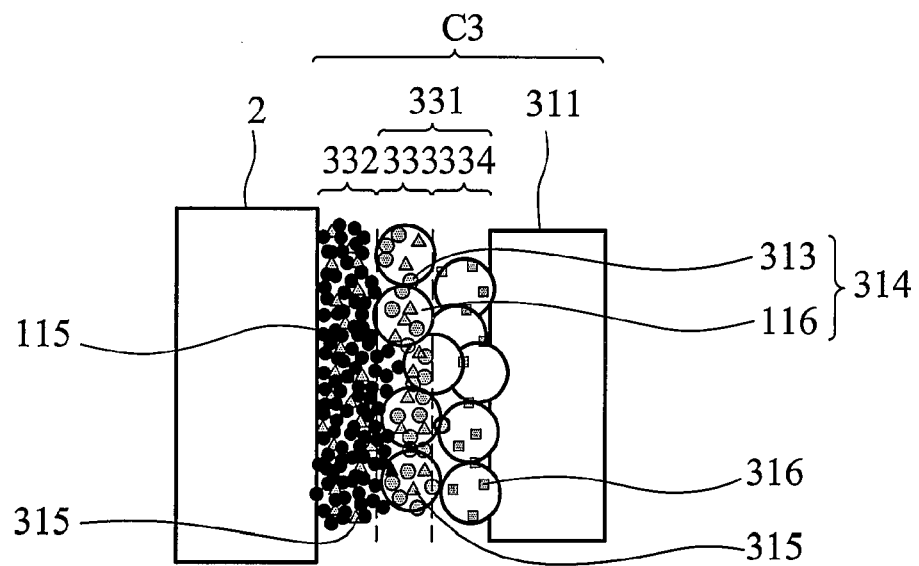
FIG. 10 is a schematic view of a cathodic structure (C3) of the invention.

In FIG. 10, the cathode structure C3 sequentially comprises a second thin platinum alloy black layer 332 disposed next to the ionic exchange membrane 2, a carbon support layer 331 and a second substrate layer 311. The second thin platinum alloy black layer 332 is preferably dispersed on the surface of the ionic exchange membrane 2. The second thin platinum alloy black layer 332 comprises a plurality of platinum alloy particles 115 and an appropriately of second polymers 315. The platinum alloy particles 115 are linked by the second polymers 315 to form the second thin platinum alloy black layer 332. The second thin platinum alloy black layer 332 is a thickly and densely catalytic layer, and the platinum alloy particles are formed by platinum (Pt) combined with components such as Sn, Mo, Rh, W, Pd, Ir or Au. The carbon support layer 331 comprises a platinum catalytic carbon support layer 333 disposed next to the second thin platinum alloy black layer 332 and a non-catalytic carbon support layer 334. The platinum catalytic carbon support layer 333 comprises a plurality of platinum catalytic carbon support particles 314 and a appropriately second polymers 315, and the platinum catalytic carbon support particles 314 comprises a plurality of carbon support particles 116 and a plurality of platinum catalytic particles 313 dispersed on surfaces of the carbon support particles 116. The platinum catalytic carbon support particles 314 are linked by the second polymers 315 to form the platinum catalytic carbon support layer 333. The configuration of the non-catalytic carbon support layer 334 of the cathode structure C3 is similar to the non-catalytic carbon support layer 318 of the cathode structure C1. The non-catalytic carbon support layer 334 comprises a plurality of carbon support particles 116 which are made of conductive and anti-corrosive carbon material. The second thin platinum alloy black layer 332 consumes the fuel traveling through the ionic exchange membrane 2 and the cathode structure C3 from the anodic structure 71, and the platinum catalytic carbon support layer 333 catalyzes oxygen located in the cathode structure C3 to perform a reduction reaction.

Figure 11:
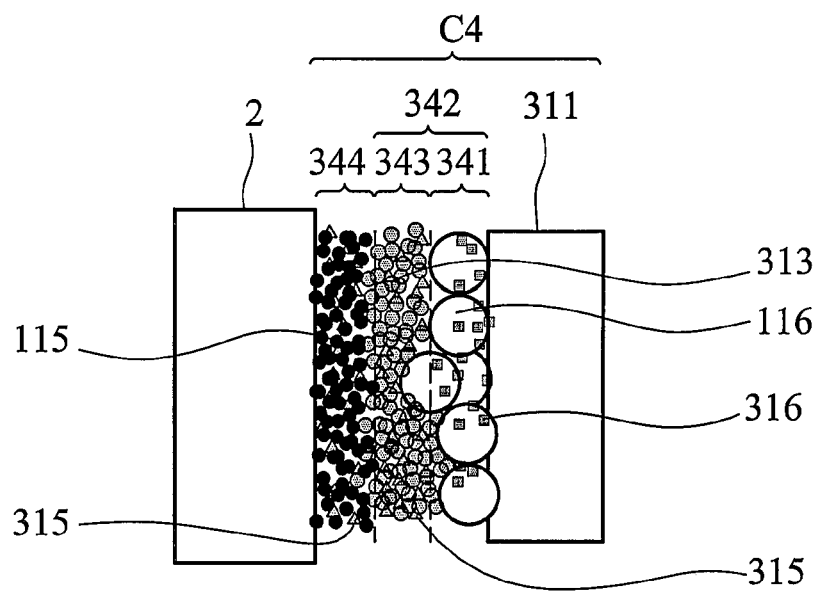
FIG. 11 is a schematic view of a cathodic structure (C4) of the invention.

In FIG. 11, the cathode structure C4 sequentially comprises a second thin platinum alloy black layer 344 disposed next to the ionic exchange membrane 2, a platinum catalytic layer 342 and a second substrate layer 311. The configuration of the second thin platinum alloy black layer 344 of the cathode structure C4, similar to the second thin platinum alloy black layer 332, comprises the platinum alloy particles 115 and the second polymers 315, and the second thin platinum alloy black layer 344 is formed by the second polymers 315 linked by the platinum alloy particles 115. The platinum catalytic layer 342 comprises a platinum black layer 343 disposed next to the second thin platinum alloy black layer 344 and a second non-catalytic carbon support layer 341. The platinum black layer 343 comprises a plurality of platinum catalytic particles 313 and an appropriately of second polymers 315. The platinum catalytic particles 313 are linked by the second polymers 315 to form the platinum black layer 343. The configuration of the second non-catalytic carbon support layer 341 of the cathode structure C4, similar to the non-catalytic carbon support layer 318 of the cathode structure C1, comprises a plurality of carbon support particles 116 which are made of conductive and anti-corrosive carbon material. The second thin platinum alloy black layer 344 consumes the fuel traveling through the ionic exchange membrane 2 and the cathode structure C4 from the anodic structure 71, and the platinum black layer 343 catalyzes oxygen located in the cathode structure C3 to perform a reduction reaction.

Figure 12:
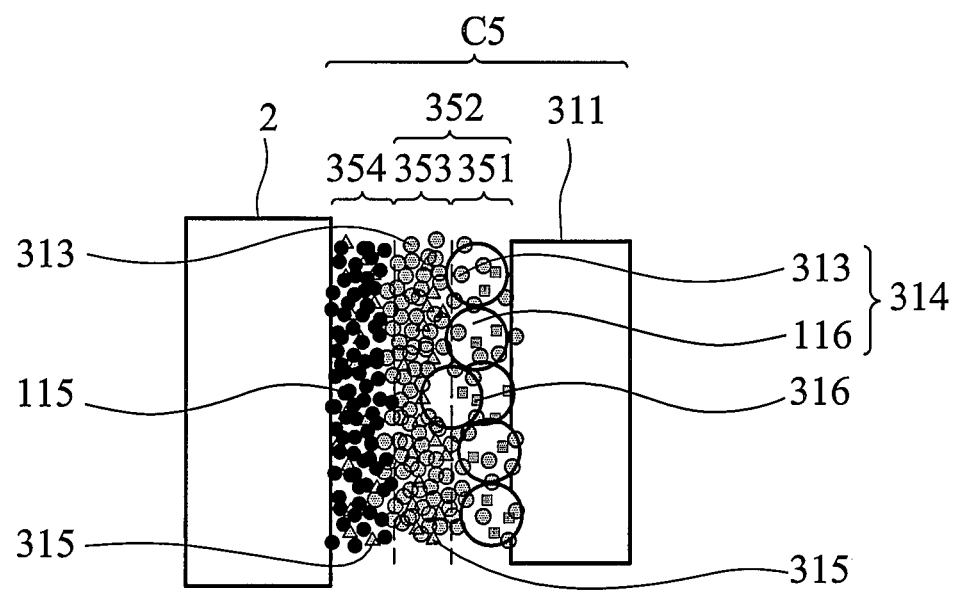
FIG. 12 is a schematic view of a cathodic structure (C5) of the invention.

In FIG. 12, the cathode structure C5 sequentially comprises a second thin platinum alloy black layer 354 disposed next to the ionic exchange membrane 2, a platinum catalytic layer 352 and a second substrate layer 311. The configuration of the second thin platinum alloy black layer 354 of the cathode structure C5, similar to the second thin platinum alloy black layer 332 of the cathode structure C3, comprises a plurality of platinum alloy particles 115 and a appropriately of second polymers 315, and the second thin platinum alloy black layer 354 is formed by the second polymers 315 linked by the platinum alloy particles 115. The platinum catalytic layer 352 comprises a platinum black layer 353 disposed next to the second thin platinum alloy black layer 354 and a platinum catalytic carbon support layer 351. The configuration of the platinum black layer 353 of the cathode structure C5, similar to the platinum black layer 343 of the cathode structure C4, comprises a plurality of platinum catalytic particles 313 and a appropriately of second polymers 315, and the platinum catalytic particles 313 are linked by the second polymers 315 to form the platinum black layer 353. The configuration of the platinum catalytic carbon support layer 351 of the cathode structure C5, similar to the platinum catalytic carbon support layer 333 of the cathode structure C3, comprises a plurality of platinum catalytic carbon support particles 314 and a appropriately of second polymers 315. The platinum catalytic carbon supports 314 comprises a plurality of carbon support particles 116 and a plurality of platinum catalytic particles 313 dispersed on surfaces of the carbon support particles 116, and the platinum catalytic carbon support layer 351 is linked by the second polymers 315 to form the platinum catalytic carbon support particles 314.

Figure 13:
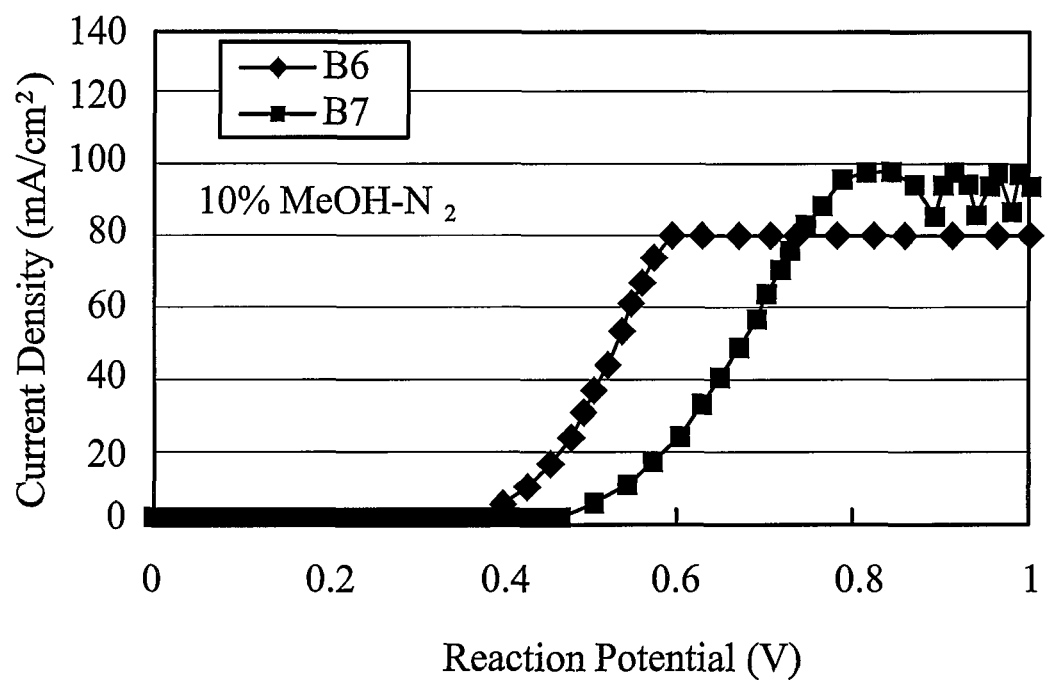
FIG. 13 is a diagram comparing the fuel crossover status between the anodic structure (A5) of the invention and the conventional anodic structure (A2)

FIG. 13 is a diagram comparing the fuel crossover status of methanol fuel of liquid, gel, solid or gaseous organic fuel (e.g., alcohol, aldehyde or acid) between the anodic structure A5 of the invention and the conventional anodic structure A2. A 10% MeOH—N2 represents a 10% concentration of methanol fuel entering the anode structure and nitrogen entering the cathode structure. An ordinate and an abscissa represent current density and reaction potential, respectively. In the cathode structure, a reduction reaction of hydrogen ions is performed by an external voltage. In the anode structure, an oxidation reaction of methanol fuel is performed. Methanol fuel, from the anode structure, throughout the ionic exchange membrane and diffusing to the cathode structure, are oxidized at the cathode structure. When the reaction potential is approximately equal to 0.8V, the rate of methanol fuel diffusing to the cathode structure is equal to the tested current density, i.e., a current density determines the diffusion rate of methanol fuel. A reference signal B7 represents a diffusion rate curve of methanol fuel in the conventional anode structure A2, and a reference signal B6 represents a diffusion rate curve of methanol fuel in the anode structure A5, wherein the diffusion rate curve B7 is higher than the diffusion rate curve B6. When the reaction potential is about 0.8V, the unitary current density of the diffusion rate curve B7 is substantially higher than that of the diffusion rate curve B6 at 20%. That is to say, the amount of the methanol fuel crossover of the conventional anode structure A2 is far higher than that of the anode structure A5.

Figure 14A:
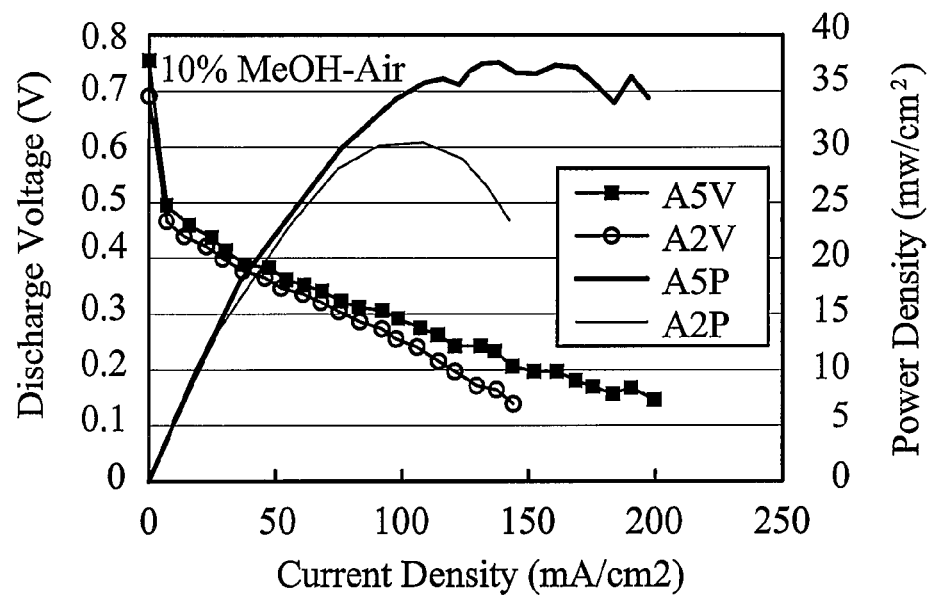
FIG. 14A is a diagram comparing discharge performance at 10% fuel concentration between the anodic structure (A5) of the invention and the conventional anodic structure (A2)

FIG. 14A is a diagram comparing discharge performance at 10% fuel concentration between the anodic structure A5 of the invention and the conventional anodic structure A2. A 10% MeOH-AIR represents a 10% concentration of methanol fuel entering the anode structure and air entering the cathode structure. The flow rate of methanol fuel in the anodic structure is four times value of the theoretical flow rate, and the flow rate of air in the cathodic structure is eight times value of the theoretical flow rate. A left ordinate represents a discharge voltage, a right ordinate represents a power density, and an abscissa represents current density. A reference signal A2V represents a discharge voltage curve of the conventional anodic structure A2, and a reference signal A5V represents a discharge voltage curve of the anodic structure A5 of the invention. The discharge voltage curves A2V and A5V operate under different current densities, respectively. A reference signal A2P represents a power density curve of the conventional anodic structure A2, and a reference signal A5P represents a power density curve of the anodic structure A5. The power density curves A2P and A5P operate under different current densities, respectively. The discharge voltage curve A5V is relatively higher than the discharge voltage curve A2V, and the maximum power density of the A5P is higher than the A2P about 18%. Thus, the performance of the anodic structure A5 of the invention is superior to that of the conventional anodic structure A2.

Figure 14B:
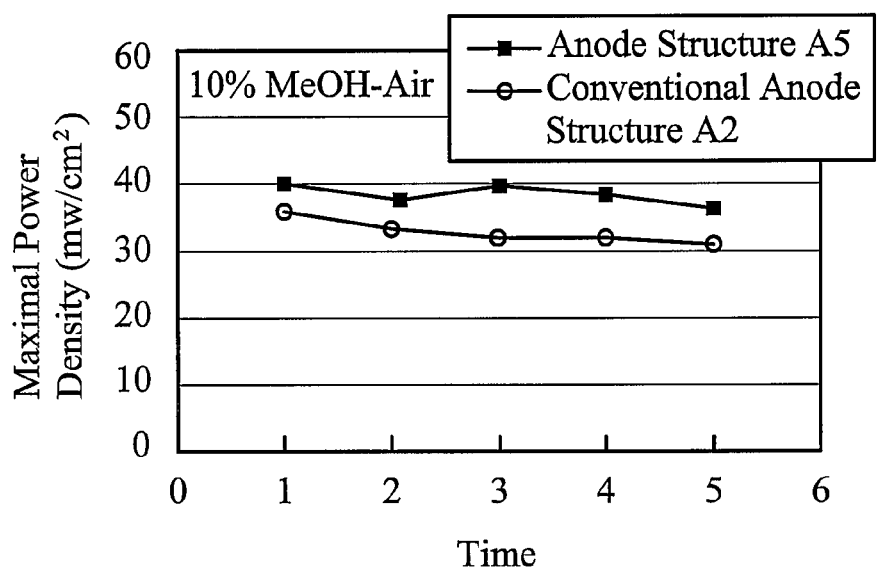
FIG. 14B is a diagram comparing maximal power density at 10% fuel concentration between the anodic structure (A5) of the invention and the conventional anodic structure (A2)

FIG. 14B is a diagram comparing maximal power density at 10% fuel concentration between the anodic structure A5 of the invention and the conventional anodic structure A2. An ordinate and an abscissa represent maximal power density and discharge test times, respectively. After a series of discharge tests, the maximal power density of the anodic structure A5 is smooth and stable, but the conventional anodic structure A2 gradually decreases.

Figure 15A:
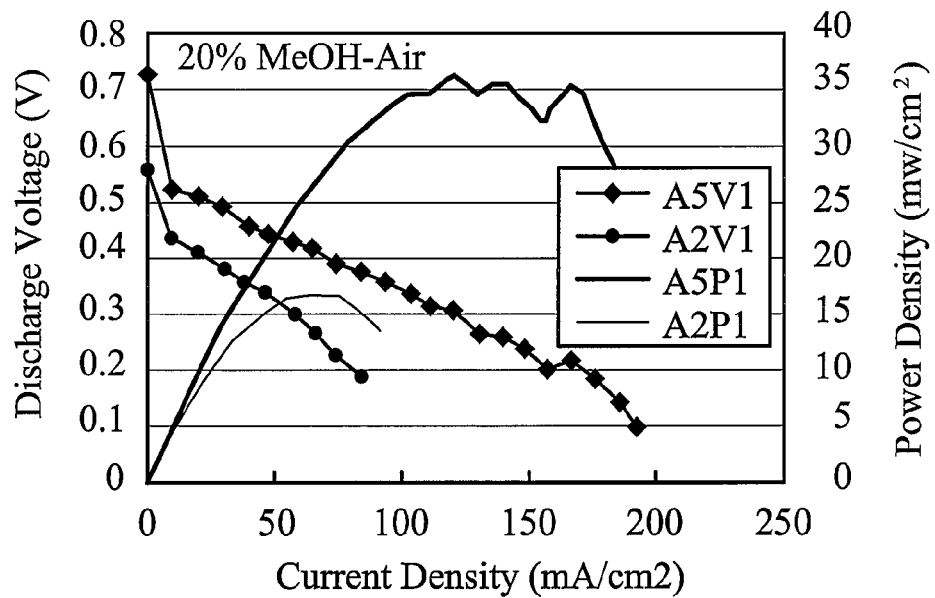
FIG. 15A is a diagram of discharge performance at 20% fuel concentration between the anodic structure (A5) of the invention and the conventional anodic structure (A2)

FIG. 15A is a diagram comparing discharge performance at 20% of fuel concentration between the anodic structure A5 of the invention and the conventional anodic structure A2. A 20% MeOH-AIR represents 20% concentration of methanol fuel entering the anode structure and air entering the cathode structure. The flow rate of methanol fuel in the anodic structure is four times value of the theoretical flow rate, and the flow rate of air in the cathodic structure is four times value of the theoretical flow rate. A left ordinate represents a discharge voltage, a right ordinate represents a power density, and an abscissa represents current density. A reference signal A2V1 represents a discharge voltage curve of the conventional anodic structure A2, and a reference signal A5V1 represents a discharge voltage curve of the anodic structure A5 of the invention. The discharge voltage curves A2V1 and A5V1 operate under different current densities, respectively. A reference signal A2P1 represents a power density curve of the conventional anodic structure A2, and a reference signal A5P1 represents a power density curve of the anodic structure A5. The power density curves A2P1 and A5P1 operate under different current densities, respectively. The discharge voltage curve A5V1 is relatively higher than the discharge voltage curve A2V1, and the maximum power density of the discharge voltage curve A5V is higher than the discharge voltage curve A2V about 45%. Thus, the performance of the anodic structure A5 of the invention is superior to that of the conventional anodic structure A2.

Figure 15B:
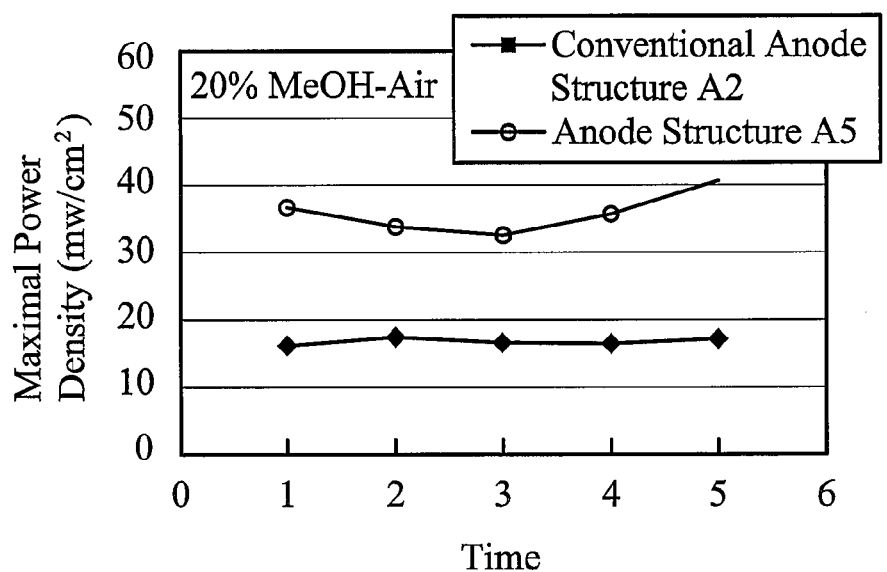
FIG. 15B is a diagram comparing maximal power density at 20% fuel concentration between the anodic structure (A5) of the invention and the conventional anodic structure (A2)

FIG. 15B is a diagram comparing maximal power density at 20% fuel concentration between the anodic structure A5 of the invention and the conventional anodic structure A2. An ordinate and an abscissa represent maximal power density and discharge test times, respectively. After the discharge tests, the maximal power density of the anodic structure A5 is smooth and stable, but the conventional anodic structure A2 gradually decreases. The maximal power density of the anodic structure A5 is higher than the conventional anodic structure A2 about 45%. Thus, the performance of the anodic structure A5 of the invention is superior to that of the conventional anodic structure A2.

Figure 16A:
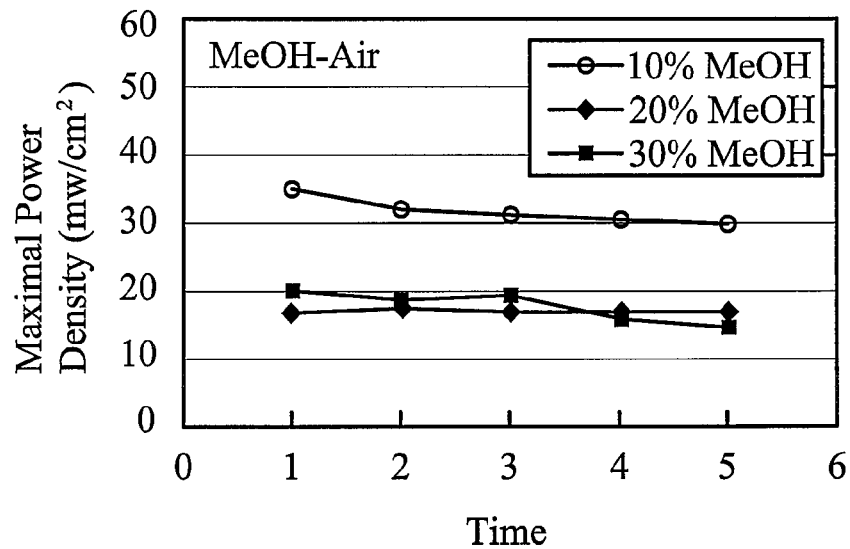
FIG. 16A is a diagram of maximal power density of the conventional anodic structure (A2) at different fuel concentrations.

FIG. 16A is a diagram of maximal power density of the conventional anodic structure A2 at different fuel concentrations. An ordinate and an abscissa represent maximal power density and discharge test times, respectively. Each curve represents the testing result of the corresponding methanol fuels. The 30% MeOH, 20% MeOH and 10% MeOH represent 30%, 20% and 10% concentrations of methanol fuels entering the anode structure and air entering the cathode structure.

Figure 16B:
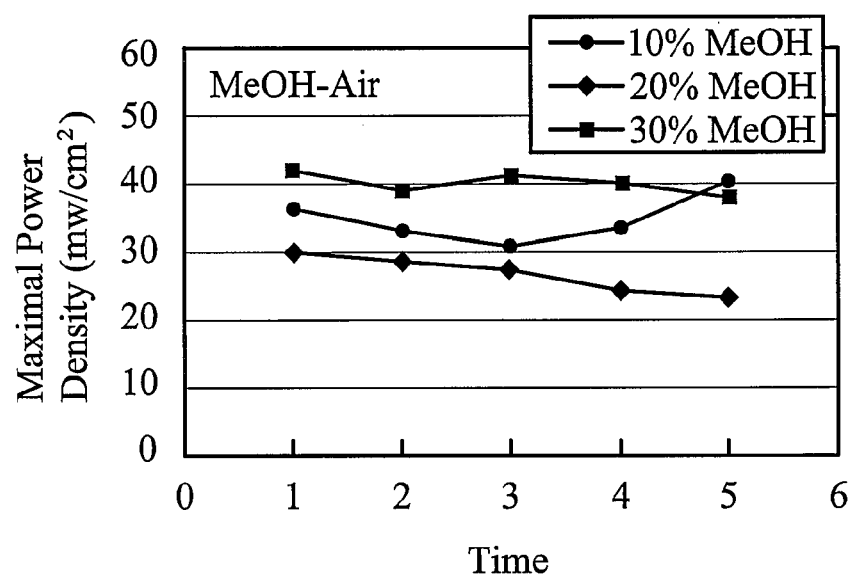
FIG. 16B is a diagram of maximal power density of the anodic structure (A5) of the invention at different fuel concentrations.

FIG. 16B is a diagram of maximal power density of the anodic structure A5 of the invention at different fuel concentrations. An ordinate and an abscissa represent maximal power density and discharge test times, respectively. The 30% MeOH, 20% MeOH and 10% MeOH represent 30%, 20% and 10% fuel concentrations. In comparison with FIG. 16A, the maximal power density of the anodic structure A5 is smooth and stable. Thus, the stability of discharge and performance of the anodic structure A5 of the invention are superior to that of the conventional anodic structure A2.

A theoretical simulation is applicable in describing the superiority of the platinum alloy carbon support layer 712 and the first thin platinum alloy black layer 711 of the anodic structure 71 of the invention. The concentration of the methanol fuel distributed in the catalytic layer (e.g. platinum alloy carbon support layer or platinum alloy black layer) can be substantially calculated by the following expressions, wherein $$c(y) = \frac{\frac{\cosh[\Phi e^{\mu/2}(y-1)]}{\cosh[\Phi e^{\mu/2}]}}{1 + \Gamma e^\mu \frac{\tanh(\Phi e^{\mu/2})}{\Phi e^{\mu/2}}}$$

$$\Phi = \sqrt{\frac{k^\circ L_y}{D_a}}, \quad \Gamma = \frac{\delta k^\circ}{D_f}$$

c(y) represents a function of concentration distribution of the methanol fuel, y represents locations of the methanol fuel located in the catalytic layer, k° represents a reaction constant, $L_y$ represents a thickness of the catalytic layer, $D_a$ represents a diffusion coefficient of the methanol fuel located in the catalytic layer, $D_f$ represents a diffusion coefficient of the methanol fuel located in the substrate, δ represents a thickness of the substrate, and μ represents the equivalent potential.

The conventional anodic structures A1, A2 and the anodic structure 71 of the invention, for example, are incorporated into the described three expressions, and the results are respectively represented by three different catalytic layers A, B and C in Table 1. The 20% PtRu/C of the catalytic layer A represents having 20% Pt and Ru alloy particles of platinum alloy carbon support layer 112 of the conventional anodic structure A1, the catalytic layer B containing PtRu black represents the platinum alloy black layer 121 of the conventional anodic structure A2, and the catalytic layer C containing the platinum alloy carbon support layer 712 and the thin platinum alloy black layer 711 represents the platinum alloy carbon support layer 712 and the first thin platinum alloy black layer 711 of the anodic structure 71 of the invention.

Table 1 represents the required thickness and weight of the catalytic layers A, B and C, to prevent the methanol fuels crossover from anode to cathode. Based on the table 1. The amount of total catalyst of the catalytic layer C is less than that of the catalytic layers A and B at half. Thus, the cost of catalytic material of the catalytic layer C is lower than that of the catalytic layers A and B.

|  | Catalytic layer A | Catalytic layer B | Catalytic layer C |
| --- | --- | --- | --- |
| Configuration of first layer | 20% PtRu/C | PtRu black | 20% PtRu/C |
| Thickness of first layer, μm | 178 | 16 | 25 |
| Configuration of second layer | None | None | PtRu black |
| Thickness of second layer, μm | None | None | 5 |
| Amount of total catalyst, mg/cm² | 5 | 5 | 2.3 |

Figure 17:
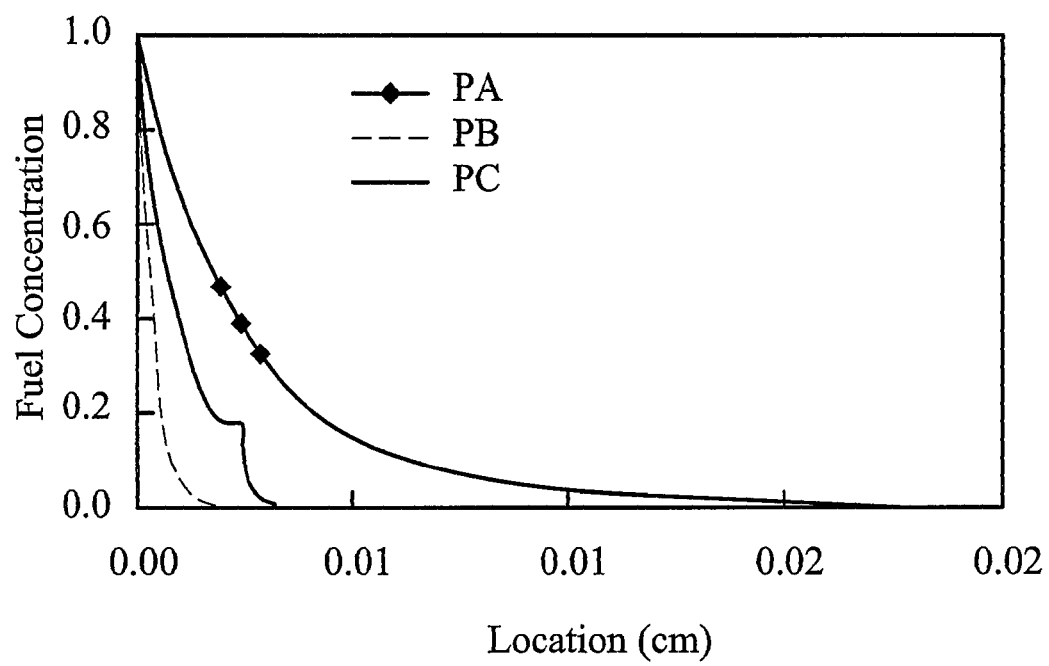
FIG. 17 is a simulated diagram of fuel concentration distribution of several catalytic layers.

FIG. 17 is a simulated diagram of fuel concentration distribution of several catalytic layers based on the function c(y) of concentration distribution of the methanol fuel. An ordinate and an abscissa represent concentration of the methanol fuel and the location of the methanol fuel in the catalytic layer. A reference signal PA represents a concentration distribution curve of the methanol fuel of the catalytic layer A, a reference signal PB represents a concentration distribution curve of the methanol fuel of the catalytic layer B, and a reference signal PC represents a concentration distribution curve of the methanol fuel of the catalytic layer C. The locations of the concentration distribution curves PA, PB and PC, corresponding to zero of the ordinate and approaching to the abscissa, represent the thicknesses required by the catalytic layers A, B and C when the corresponding methanol fuels are completely consumed, respectively. It is understood that the greatest thickness is required by the catalytic layer A, the least thickness is required by the catalytic layer B, and the thickness of the catalytic layer C ranges between the thicknesses required by the catalytic layers A and B. The greater the thickness of the catalytic layer, such as the catalytic layer A, the greater the number of cracks formed during the manufacturing process of the electrode. On the other hand, a thinner catalytic layer, such as the catalytic layer B, has less catalyst utilization and the higher material cost. Note that the thickness of the catalytic layer C ranges between the thicknesses required by the catalytic layers A and B excludes the defections of the catalytic layers A and B and make use of the catalyst thereof.

The invention provides the combination of the platinum alloy carbon support layer 712 and the first thin platinum alloy black layer 711 of the anodic structure 71, to solve the fuel crossover problems of the conventional arts. Thus, the required thickness of the platinum alloy carbon support layer 112 of the conventional anodic structure A1 can be reduced, the path of carbon dioxide in the platinum alloy black layer 121 of the anodic structure A2 is reduced, the reaction power density is increased, and the cost of material of the fuel cell is reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrode structure for a fuel cell, the electrode structure comprising:
   a cathodic structure;
   an ionic exchange membrane disposed next to the cathodic structure; and
   an anodic structure, comprising a first platinum alloy black layer, a catalytic platinum alloy carbon support layer and a first substrate layer in sequence, wherein the first platinum alloy black layer is disposed between the ionic exchange membrane and the catalytic platinum alloy carbon support layer, wherein the first platinum alloy black layer is free of carbon support particles and is thinner and denser than the catalytic platinum alloy carbon support layer, and wherein the first platinum alloy black layer is in direct contact with the ionic exchange membrane and is a layer consisting of platinum alloy particles and polymer.

2. The electrode structure as claimed in claim 1, wherein the first substrate layer comprises a carbon substrate.

3. The electrode structure as claimed in claim 1, wherein the platinum alloy particles are linked by the polymer to form the first platinum alloy black layer.

4. The electrode structure as claimed in claim 1, wherein the catalytic platinum alloy carbon support layer comprises a plurality of platinum alloy particles on carbon support particles, and a polymer, wherein the platinum alloy particles on carbon support particles are linked by the polymer to form the catalytic platinum alloy carbon support layer.

5. The electrode structure as claimed in claim 1, wherein the catalytic platinum alloy carbon support layer comprises a combination of a first platinum alloy carbon support layer and a second platinum alloy carbon support layer, wherein the concentration of platinum alloy particles in the first platinum alloy carbon support layer is greater than the concentration of platinum alloy particles in the second platinum alloy carbon support layer.

6. The electrode structure as claimed in claim 1, further comprising a non-catalytic carbon support layer disposed between the catalytic platinum alloy carbon support layer and the first substrate layer.

7. The electrode structure as claimed in claim 1, wherein the fuel cell generates power by use of a fuel comprising an organic fuel comprising available fuels of liquid, gel, solid or gaseous types which contain alcohol, aldehyde or acid.

8. A power generation fuel cell, comprising:
a fuel; and
an electrode structure used to actuate the fuel to generate electricity, comprising:
a cathodic structure;
an ionic exchange membrane disposed next to the cathodic structure; and
an anodic structure, comprising a first platinum alloy black layer, a catalytic platinum alloy carbon support layer and a first substrate layer in sequence, wherein the first platinum alloy black layer is disposed between the ionic exchange membrane and the catalytic platinum alloy carbon support layer, wherein the first platinum alloy black layer is free of carbon support particles and is thinner and denser than the catalytic platinum alloy carbon support layer, and wherein the first platinum alloy black layer is in direct contact with the ionic exchange membrane and is a layer consisting of platinum alloy particles and polymer.

9. The power generation fuel cell as claimed in claim 8, wherein the first substrate layer comprises a carbon substrate.

10. The power generation fuel cell as claimed in claim 8, wherein the platinum alloy black particles are linked by the polymer to form the first platinum alloy black layer.

11. The power generation fuel cell as claimed in claim 8, wherein the catalytic platinum alloy carbon support layer comprises a plurality of platinum alloy particles on carbon support particles, and a polymer, wherein the platinum alloy particles on carbon support particles are linked by the polymer to form the catalytic platinum alloy carbon support layer.

12. The power generation fuel cell as claimed in claim 8, wherein the catalytic platinum alloy carbon support layer comprises a combination of a first platinum alloy carbon support layer and a second platinum alloy carbon support layer, wherein the concentration of platinum alloy particles in the first platinum alloy carbon support layer is greater than the concentration of platinum alloy particles in the second platinum alloy carbon support layer.

13. The power generation fuel cell as claimed in claim 8, further comprising a non-catalytic carbon support layer disposed between the catalytic platinum alloy carbon support layer and the first substrate layer.

14. The power generation fuel cell as claimed in claim 8, wherein the fuel comprises an organic fuel comprising available fuels of liquid, gel, solid or gaseous types which contain alcohol, aldehyde or acid.

* * * * *